US005926280A

United States Patent [19]

Yamagishi et al.

[11] Patent Number: 5,926,280

[45] Date of Patent: Jul. 20, 1999

[54] FIRE DETECTION SYSTEM UTILIZING RELATIONSHIP OF CORRESPONDENCE WITH REGARD TO IMAGE OVERLAP

[75] Inventors: Takatoshi Yamagishi; Misaki Kishimoto, both of Tokyo, Japan

[73] Assignee: Nohmi Bosai Ltd., Tokyo, Japan

[21] Appl. No.: 08/901,074

[22] Filed: Jul. 28, 1997

[30] Foreign Application Priority Data

Jul. 29, 1996 [JP] Japan .................................... 8-199470

[51] Int. Cl.[6] ...................................................... G01B 11/00

[52] U.S. Cl. ............................................ 356/390; 356/328

[58] Field of Search .................................... 356/320, 328, 356/315; 340/577–78; 250/554; 348/143, 145, 162, 166, 159

[56] References Cited

U.S. PATENT DOCUMENTS 5,289,275 2/1994 Ishii et al. ............................... 340/578

*Primary Examiner*—Robert H. Kim
*Attorney, Agent, or Firm*—Wenderoth, Lind & Ponack, L.L.P.

[57] ABSTRACT

A fire detection system extracts fire (flame) portions from images produced by a monitoring camera while eliminating portions depicting artificial light sources. Portions depicting a light source that emits light are extracted from images produced by the monitoring camera. The system judges whether or not pairs of the extracted portions of images produced with the passage of time have a relationship of correspondence. If the extracted portions are contained in images produced for a given period of time, the light source is judged not to be the lamps of a moving vehicle, and is therefore identified as a fire. An area of an overlapping part of the extracted portions of images produced at different time instants, and an overall area of the extracted portions are computed, and the ratio of the area of the overlapping part to the overall area, that is, the area ratio between the extracted portions is computed. Incorrect alarming due to a vehicle at a standstill or a rotating lamp can be prevented.

21 Claims, 6 Drawing Sheets

| EXTRACTED PORTION | CYCLE t<br>EXAMPLE :<br>T21 AND T22<br>(T22 AND T23)<br>(T23 AND T24) | AREA RATIO | CYCLE 2t<br>EXAMPLE :<br>T22 AND T24<br>(T24 AND T26)<br>(T26 AND T28) | AREA RATIO |
|---|---|---|---|---|
| HEAD-LIGHTS OF VEHICLE AT A STAND-STILL |  | 1.0 |  | 1.0 |
| ROTATING LAMP |  | 0.6~0.8 |  | 0~0.2 |
| FLAME |  | 0.65~0.85 |  | 0.65~0.85 |

FIRE DETECTION SYSTEM UTILIZING RELATIONSHIP OF CORRESPONDENCE WITH REGARD TO IMAGE OVERLAP

BACKGROUND OF THE INVENTION

1. Field of the Invention

The present invention relates to a fire detection system employing image processing.

2. Description of the Related Art

A system for detecting a fire using an image processing unit has been disclosed in, for example, Japanese Patent Laid-Open No. 5-20559. The major principle of this kind of system is to sense the flame of a fire by extracting a portion exhibiting a given brightness level from a produced image.

When the fire detection system is installed in a monitored field, for example, a tunnel, light sources having a given brightness level other than flame are as follows:

<1> an artificial light source for illumination (sodium lamp)

<2> a light source on the back of a vehicle (tail lamps or position lamps)

<3> a light source on the front of a vehicle (headlights, halogen lamps, or fog lamps)

<4> a light source on an emergency vehicle (rotating lamp)

These light sources may become causes of incorrect alarming.

An object of the present invention is to provide a fire detection system capable of reliably sensing flame alone using monitoring images while being unaffected by such artificial light sources.

SUMMARY OF THE INVENTION

According to one aspect of the present invention, there is provided a fire detection system, which has an imaging camera for imaging a monitored field and outputting an image signal, and an image memory for storing images produced by the imaging camera, and which detects a fire by processing images stored in the image memory. The system includes a fire area extracting means for extracting a fire-suspected portion from each of the images, a correspondence judging means for judging whether or not a pair of fire-suspected portions of images produced by the imaging camera with a given time interval between them have a relationship of correspondence, and a first fire judging means that, when the correspondence judging means judges that a given number of pairs of fire-suspected portions have the relationship of correspondence, judges that the fire-suspected portions are real fire portions.

According to this arrangement, it can be judged whether or not a light source existing for a given period of time is depicted in images produced by a monitoring camera. An immobile light source such as flame can be discriminated from a light source that moves in a monitored field such as a vehicle. Incorrect alarming due to the headlights of a moving vehicle can be prevented.

In one form of the invention, a fire detection system further comprises a means for computing the magnitude of a variation between a pair of fire-suspected portions of images produced with the given time interval between them, and a second fire judging means that, when the magnitudes of variations fall within a given range, judges that the fire-suspected portions are real fire portions.

According to this arrangement, it is judged from variations among pairs of fire-suspected portions of images produced with two different given time intervals between them whether or not the fire-suspected portions are real fire portions.

In another form of the invention, every time a plurality of images are stored in the image memory, the correspondence judging means judges if pairs of extracted portions of the plurality of images have the relationship of correspondence. The images which are produced with the given time interval between them and which are checked to see if the extracted portions thereof have the relationship of correspondence are a pair of immediately preceding and succeeding images.

In a further form of the invention, every time a plurality of images are stored in the image memory, the correspondence judging means judges if pairs of extracted portions of the plurality of images have the relationship of correspondence. The images which are produced with the given time interval between them and which are checked to see if the extracted portions thereof have the relationship of correspondence are a pair of images mutually separated by the plurality of images.

In a still further form of the invention, the number of images to be produced during a period which the plurality of images can be produced with the given time interval between them is reduced in order to allocate saved time to image processing.

In a yet further form of the invention, the means for computing the magnitude of a variation includes an area computing means for computing the area of an overlapping part of a pair of fire-suspected portions of images produced with the given time interval between them and the overall area of the fire-suspected portions, and a ratio computing means for computing the ratio of the area of the overlapping part to the overall area of the fire-suspected portions, that is, the area ratio between the fire-suspected portions.

According to this arrangement, the area of an overlapping part of extracted portions of images produced at different time instants and the overall area of the extracted portions are calculated, and the ratio of the area of the overlapping part to the overall area, that is, the area ratio between the extracted portions is computed. Both a vehicle at a standstill and flame may exist in a monitored field. Since the area of an overlapping part of portions of images depicting the headlights of a vehicle at a standstill or the like agrees with the overall area of the portions, the area ratio between portions depicting the headlights of a vehicle at a standstill or the like becomes a maximum value of 1. By contrast, the area ratio between portions depicting flame whose area varies all the time always has a value smaller than 1. The two light sources can therefore be discriminated from each other. Incorrect alarming due to the headlights can be prevented.

In another form of the invention, when the area ratios fall within a given range, the second fire judging means judges that the fire-suspected portions are real fire portions.

In another form of the invention, the means for computing the magnitude of a variation is a means for computing two kinds of magnitudes of variations, that is, the magnitude of a variation between a pair of fire-suspected portions of images produced with a first given time interval between them, and the magnitude of a variation between a pair of fire-suspected portions of images produced with a second given time interval different from the first given time interval between them.

According to the arrangement, the areas of overlapping parts of extracted portions of images produced with at least two different given time intervals between them, and the overall areas of the extracted portions are computed. In the case of a rotating lamp or the like, the area ratios among extracted portions of images produced with a certain time interval between them which depict the rotating lamp are close to the area ratios among extracted portions of images depicting flame. Nevertheless, since extracted portions of images produced with a different time interval between them are used to compute area ratios, and since the extracted portions depicting the rotating lamp exhibit variations that are different with imaging cycles, the light source depicted by the extracted portions can be identified by discriminating flame from the rotating lamp. Thus, incorrect alarming due to the rotating lamp can be prevented.

In another form of the invention, when the magnitudes of variations computed using images produced with the first given time interval between them have different values from the magnitudes of variations computed using images produced with the second given time interval between them, the second fire judging means judges that the fire-suspected portions are not real fire portions.

According to the arrangement, the areas of overlapping parts of pairs of extracted portions of images produced with at least two different given time intervals between them, and the overall areas of the pairs of extracted portions are computed. In the case of a rotating lamp or the like, the area ratios among extracted portions of images produced with a certain time interval between them is close to the area ratios among extracted portions of images depicting flame. Nevertheless, since the extracted portions of images produced with a different time interval between them are used to compute area ratios, the light source depicted by the extracted portions can be identified by discriminating flame from the rotating lamp. Thus, incorrect alarming due to the rotating lamp can be prevented.

In another form of the invention, the imaging camera outputs a color image signal composed of red, green, and blue color-component signals.

In another form of the invention, the fire portion extracting means extracts a portion, which is represented by the color-component signals whose red and green component signals exceed a given level, from each of the images stored in the image memory.

In another form of the invention, the fire portion extracting means includes a minimum value computation unit for comparing pixel by pixel red and green component signals of the color-component signals, and outputting a component signal having a smaller level, and a fire portion extraction unit for extracting a portion, which is represented by an output signal of the minimum value computation unit exceeding the given level, as a fire-suspected portion.

In another form of the invention, the monitored field is a tunnel, and the imaging camera is installed in the tunnel in such a manner that light emanating from the headlights of a vehicle passing through the tunnel will not fall on the imaging camera.

DESCRIPTION OF THE PREFERRED EMBODIMENTS

First Embodiment

Figure 1:
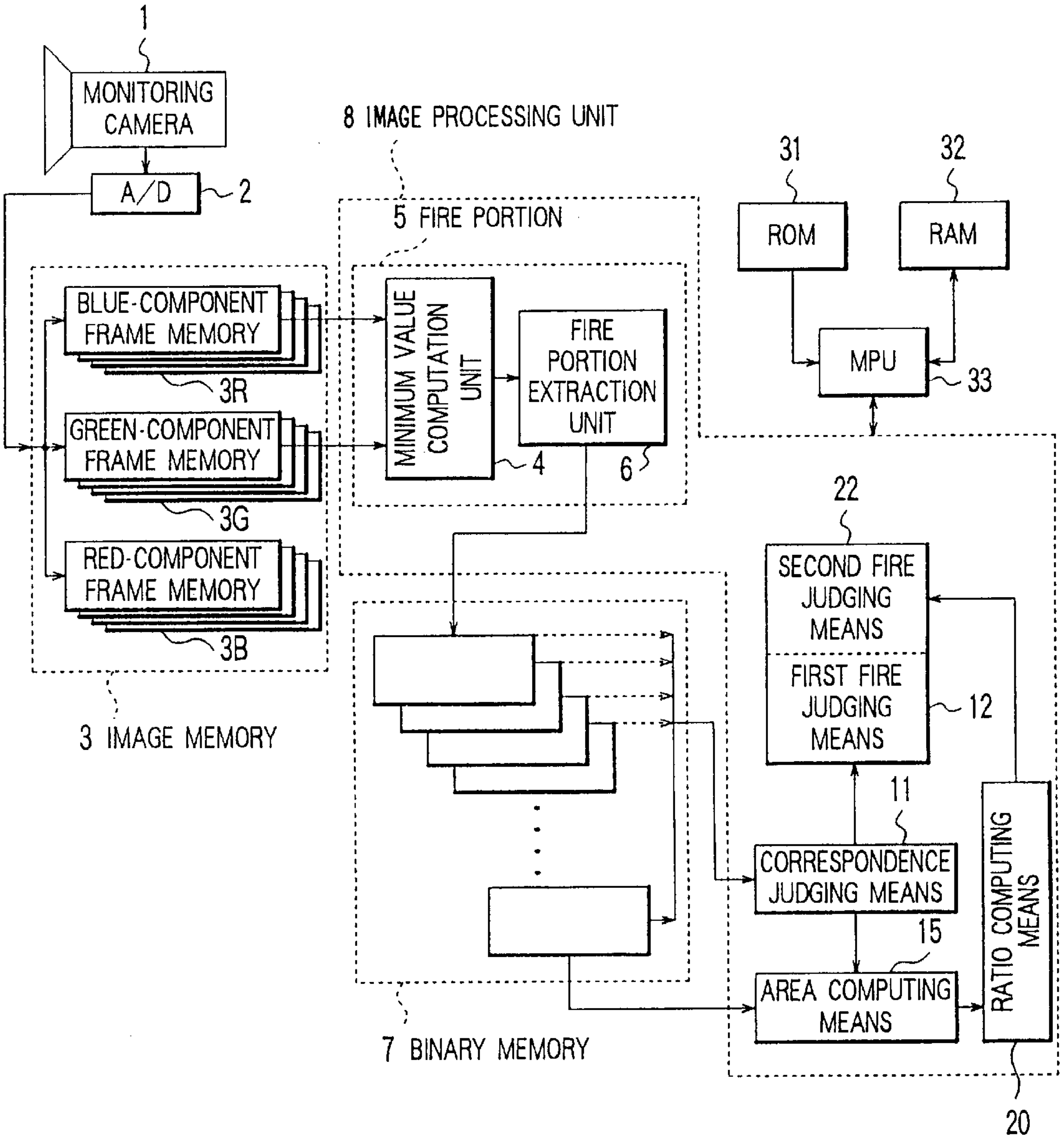
FIG. 1 is a block diagram showing a system of the present invention.

The first embodiment of the present invention will be described below. FIG. 1 is a block diagram showing the present invention. A fire detection system of the present invention comprises a monitoring camera 1, an analog-to-digital converter 2, an image memory 3, a binary memory 7, and an image processing unit 8.

The monitoring camera 1 serving as an imaging means is, for example, a CCD camera and images a monitored field at intervals of a given sampling cycle. The monitoring camera 1 outputs a color image signal, which is composed of red, green, and blue color-component signals conformable to the NTSC system, at intervals of 1/30 sec. The monitoring camera 1 is installed at a position at which the whole of a monitored field can be viewed, for example, in a tunnel that is the monitored field, and monitors if a fire breaks out. It is the image processing unit which detects whether or not a produced image has a fire portion.

Figure 2:
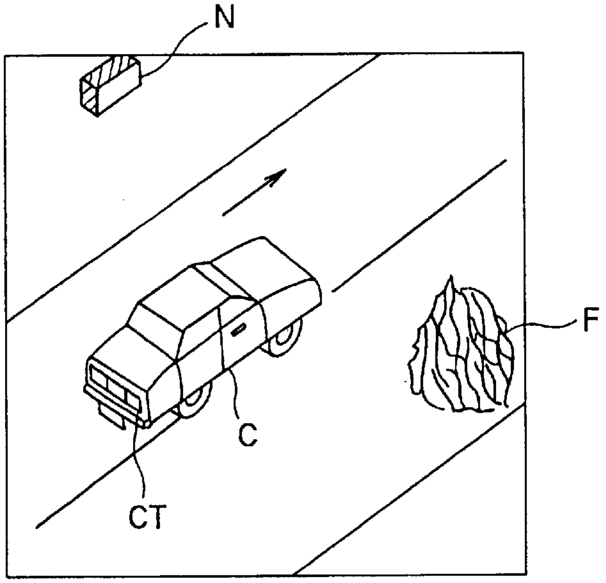
FIG. 2 shows an example of an image (raw image) produced by a monitoring camera.

FIG. 2 is a diagram showing an image produced by the monitoring camera 1. As seen from the diagram, the monitoring camera 1 is installed in, for example, an upper area on the side wall of the tunnel, so that it can produce images of a vehicle C driving away. This placement is intended to prevent light emanating from the headlights of the vehicle C from falling on the monitoring camera 1. When the monitoring camera is installed this way, portions of images depicting the headlight will not be extracted as fire portions during image processing.

The analog-to-digital converter 2 converts pixel by pixel a color image produced by the monitoring camera 1, that is, red, green, and blue signals into digital signals each representing any of multiple gray-scale levels, for example, 255 levels. The image memory 3 for storing digitized video signals consists of a red-component frame memory 3R, green-component frame memory 3G, and blue-component frame memory 3B, and stores images that are produced by the monitoring camera 1 and that constitute one screen. Each of the frame memories 3R, 3G, and 3B of the image memory 3 is composed of a plurality of memories so that a plurality of images can be stored. While the oldest image is deleted, a new image is stored to update the newest image.

A minimum value computation unit 4 (also referred to as a minimum value filter) compares the signal levels of the red and green component signals of the color-component signals which are produced at the same time instant and stored in the red-component frame memory 3R and green-component frame memory 3G, and outputs a luminance level indicated with the smaller signal level. In short, a smaller one of the luminance levels of red and green which are expressed in 255-level gray scale is output. A fire portion extraction unit 6 binary-codes an output signal of the minimum value computation unit 4 with respect to a given value, and extracts a portion, which is represented by a signal whose level exceeds the given value, as a fire-suspected portion (a portion of an image depicting a light source that may be a fire). In other words, a fire-suspected portion of an image is represented with "1" and the other portions thereof (having signal levels smaller than the given level) are represented with "0." In the description below, a fire-suspected portion may be referred to as an extracted portion. The given value is set to a value making it possible to discriminate a fire from artificial light sources so as to identify a light source depicted by portions exhibiting given brightness. The binary memory 7 consists of a plurality of memories like the image memory 3. The binary memory 7 stores images binary-coded by the fire portion extraction unit 6 and successively stores a plurality of latest images read from the image memory 3.

A correspondence judging means 11, first fire judging means 12, area computing means 15, ratio computing means 20, and second fire judging means 22 will be described later. The minimum value computation unit 4 and fire portion extraction unit 6 serve as an example of a fire portion extracting means 5 for specifying and extracting a portion of an image temporarily depicting a light source (exhibiting a given brightness level), or in particular, a fire-suspected portion. The minimum value computation unit 4, fire portion extraction unit 6, correspondence judging means 11, fire judging means 12 and 22, area computing means 15, and ratio computing means 20 constitute the image processing unit 8 for processing images. The image processing unit 8 is composed of a ROM 31 serving as a memory means, a RAM 32 serving as a temporary memory means, and a microprocessing unit (MPU) 33 serving as a computing means. Various computations carried out by the image processing unit 8 are executed by the MPU 33 according to a problem (flowchart of FIG. 6) stored in the ROM 31. Computed values are stored in the RAM 32. The ROM 31 stores a given value used for binary-coding and given values used for fire judgment.

Next, the principles of fire detection will be described briefly. Assume that an image produced by the monitoring camera 1 depicts, as shown in FIG. 2, a vehicle C, a sodium lamp N for illumination, and flame F of a fire, which exhibit three different brightness levels, as light sources having given brightness. CT in the drawing denotes tail lamps (including position lamps) of the vehicle C. Table 1 lists luminance levels indicated by three kinds of color component signals representing the tail lamps CT of the vehicle, sodium lamp N, and flame F in 255-level gray scale.

TABLE 1

Luminance levels of red, green, and blue of light sources in monitored field

| | Red | Green | Blue |
|---|---|---|---|
| Vehicle (tail lamps) | 160 | 75 | 55 |
| Sodium lamp | 200 | 85 | 70 |
| Flame | 220 | 210 | 60 |

When color components of red, green, and blue are taken into consideration, it is seen that the red and green components of the flame F exhibit high luminance levels, but only the red component of each of the artificial light sources of the tail lamps and sodium lamp, which is one of three color components, exhibits a high luminance level. In other words, by extracting a portion (pixel) whose red and green components exhibit high luminance levels, portions depicting artificial light sources can be eliminated from a monitoring image and a fire portion alone can be extracted therefrom. In consideration of the principles, the operations in accordance with the present invention will be described below.

A color image signal representing an image of a monitored field produced by the monitoring camera 1 is digitized by the analog-to-digital converter 2 and then stored in the image memory 3. More specifically, red, green, and blue signals are digitized and then written in the red-component frame memory 3R, green-component frame memory 3G, and blue-component frame memory 3B respectively. Every pixel of the image stored in the image memory 3 is subjected to minimum value computation by means of the minimum value computation unit 4. Now, image processing will be described by taking for instance portions of images that depict the tail lamps CT of the vehicle C and are represented with the color-component signals.

The minimum value computation unit 4 compares luminance levels of red and green components of each pixel indicated by the red and green component signals of the color-component signals stored in the red-component frame memory 3R and green-component frame memory 3G, and, of the two component signals, outputs the component signal indicating a lower luminance level. The red component of a portion of an image depicting the tail lamps CT has a luminance level of 160, and the green component thereof has a luminance level of 75. The luminance level 75 of the green component is therefore output. Based on the output value, the fire portion extraction unit 6 carries out binary-coding. Assuming that a given value that is a threshold value for binary-coding is set to 180, since the level output from the minimum value computation unit 4 is 75, “0” (black level) is assigned to the portion. Likewise, a portion of an image depicting the sodium lamp N undergoes minimum value computation and is subjected to binary-coding by means of the fire portion extraction unit 6. Consequently, “0” is assigned to the portion.

Next, the flame F of a fire will be discussed. The green component of the flame F has a lower luminance level than the red component thereof like the tail lamps CT and sodium lamp N (the red component may have a lower luminance level). The luminance level of the green component is therefore output from the minimum value computation unit 4. The fire portion extraction unit 6 then carries out binary-coding. Since the luminance level of the green component of the flame F is 210, which that is larger than the given value of 180. “1” is assigned to the portion of the image depicting the flame F. Since the luminance level output from the minimum value computation unit 4 is 210, the luminance level of the red component is judged to be larger than 210. In other words, a portion whose red and green components exhibit luminance levels whose values are larger than the given value can be extracted.

Figure 3:
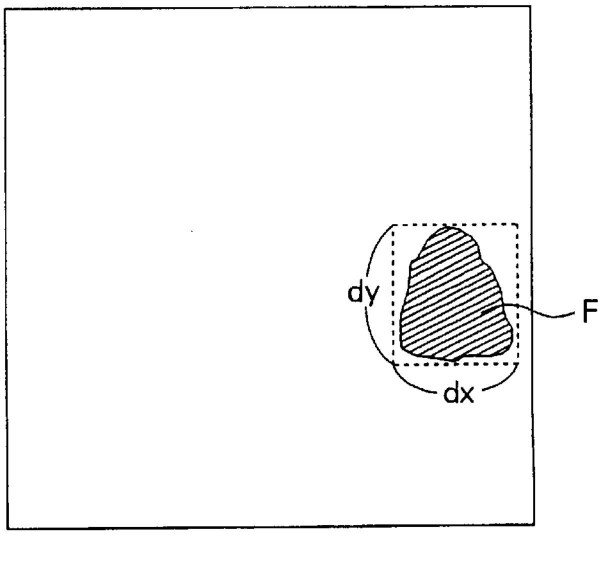
FIG. 3 is an example of an image resulting from image processing (extraction) which is stored in a binary memory.

The luminance level of a brighter portion to be expressed in 255-level gray scale is higher than the luminance level of a less bright portion. To the portions of an image depicting the body of the vehicle C and others which do not emit light, “0” is assigned on the stage of binary-coding performed by the fire portion extraction unit 6 irrespective of a result provided by the minimum value computation unit 4. FIG. 3 shows an image resulting from image processing (minimum value computation and binary-coding) which is stored in the binary memory 7. As apparent from the drawing, only a portion of an image (raw image) stored in the image memory 3 which depicts flame can be extracted and displayed, while portions thereof depicting the tail lamps CT serving as a light source on the back of a vehicle and the sodium lamp N serving as an illumination light source are eliminated.

As described in relation to the principles of fire detection, when a portion (pixel) of an image of which red and green components exhibit high luminance levels is extracted from the image memory 3, only a portion depicting flame can be extracted. The simplest method is such that portions of which red components exhibit luminance levels whose values are larger than the given value (about 180) are extracted from the red-component frame memory 3R, portions of which green components exhibit luminance levels whose values are larger than the given value are extracted from the green-component frame memory 3G, and then any of the portions extracted from red-component frame memory and any of the portions extracted from the green-component frame memory, which coincide with one another, are chosen as portions depicting flame.

In this case, three processing steps are needed: a step of searching the red-component frame memory 3R for pixels whose red components exhibit luminance levels exceeding a given value of, for example, 180, a step of searching the green-component frame memory 3G for pixels whose green components exhibit luminance levels exceeding the given value of, for example, 180, and a step of searching for any of extracted pixels which coincide with one another. When the minimum value computation unit 4 is employed, only two steps, that is, the step of comparing the luminance levels of red and green components and the step of carrying out binary-coding with respect to a given value are needed. Consequently, portions depicting flame can be detected quickly. The merit of employing the minimum value computation unit 4 in extracting portions whose red and green exhibit high luminance levels lies in a point that the step of searching for pixels whose red and green components exhibit high luminance levels can be shortened and in a point that any arithmetic operation need not be carried out.

When light emanating from the headlights of a following vehicle falls largely on the vehicle C shown in FIG. 2, the back glass of the vehicle C effects mirror reflection. This causes an image to contain a portion depicting a sideways-elongated glow in the back glass. There is a possibility that this portion is extracted even after it is subjected to minimum value computation and binary-coding. An edge processing unit is therefore included in the image processing unit for extracting the edges of a raw image. The edges are subtracted from a binary image resulting from binary-coding, whereby the edges of the binary image can be cut out. In other words, extracted portions of a binary image have the margins thereof cut out so as to become smaller by one size. Only portions having a certain width (size) remain. Portions having small widths are all eliminated as noise portions. The portion depicting a sideways-elongated glow caused by the mirror reflection of the glass can be eliminated by performing the foregoing processing.

Labeling is performed on a portion extracted by the fire portion extracting means 5 and stored in the binary memory 7. Specifically, when a plurality of fire-suspected portions are contained in an image produced at a certain time instant, different numbers (labels) are assigned to the portions. Thereafter, the results of computing the areas of the portions are stored in one-to-one correspondence with the numbers in the RAM 32.

Second Embodiment

The fire portion extracting means 5 proves effective in eliminating portions depicting a light source on the back of a vehicle or a light source for illumination from an image produced by the monitoring camera 1, but is not effective in eliminating a portion depicting a light source on the front of a vehicle or a yellow rotating lamp from the image. Preferably, the fire portion extracting means 5 is used as a means for temporarily extracting a fire-suspected portion from a raw image, and the correspondence judging means 11 and area computing means 15 are used to judge whether or not an extracted portion is a real fire portion.

Assuming that a tunnel is narrow, lanes are running bidirectionally, and a vehicle driving toward the monitoring camera must be imaged, if yellow fog lamps (or yellow halogen lamps) are located on the front of the vehicle, the lamps work as a factor of incorrect alarming. Specifically, according to the principles of fire detection in the first embodiment, a portion of an image whose red and green components exhibit high luminance levels is extracted. In terms of colors, this means that colors ranging from yellow to white are extracted. That is to say, a portion whose red and green components exhibit high luminance levels and whose blue component also exhibits a high luminance level is white, and a portion whose red and green components exhibit high luminance levels and whose blue component exhibits a low luminance level is yellow. If a yellow or white glowing body is located on the front of a vehicle, a portion depicting it may be extracted as a fire portion.

In the second embodiment, therefore, a fire detection system is designed to observe the temporal transition among portions extracted in accordance with the first embodiment, that is, temporal variations among portions extracted for a given period of time. This results in the fire detection system being unaffected by a light source located on the front of a vehicle.

In FIG. 1, when images produced periodically by the monitoring camera 1 contain continuous fire-suspected portions, that is, when fire-suspected portions are successively stored in the binary memory 7, the correspondence judging means 11 judges whether or not two fire-suspected portions of images produced at different time instants have a relationship of correspondence, that is, whether or not the portions depict the same light source. The correspondence judging means 11 can be used to judge whether or not a light source depicted by extracted portions exists in a monitored field for a given period of time. When the number of consecutive pairs of fire-suspected portions having the relationship of correspondence exceeds a given value, the first fire judging means 12 judges that the fire-suspected portions are real fire portions.

Figure 4:
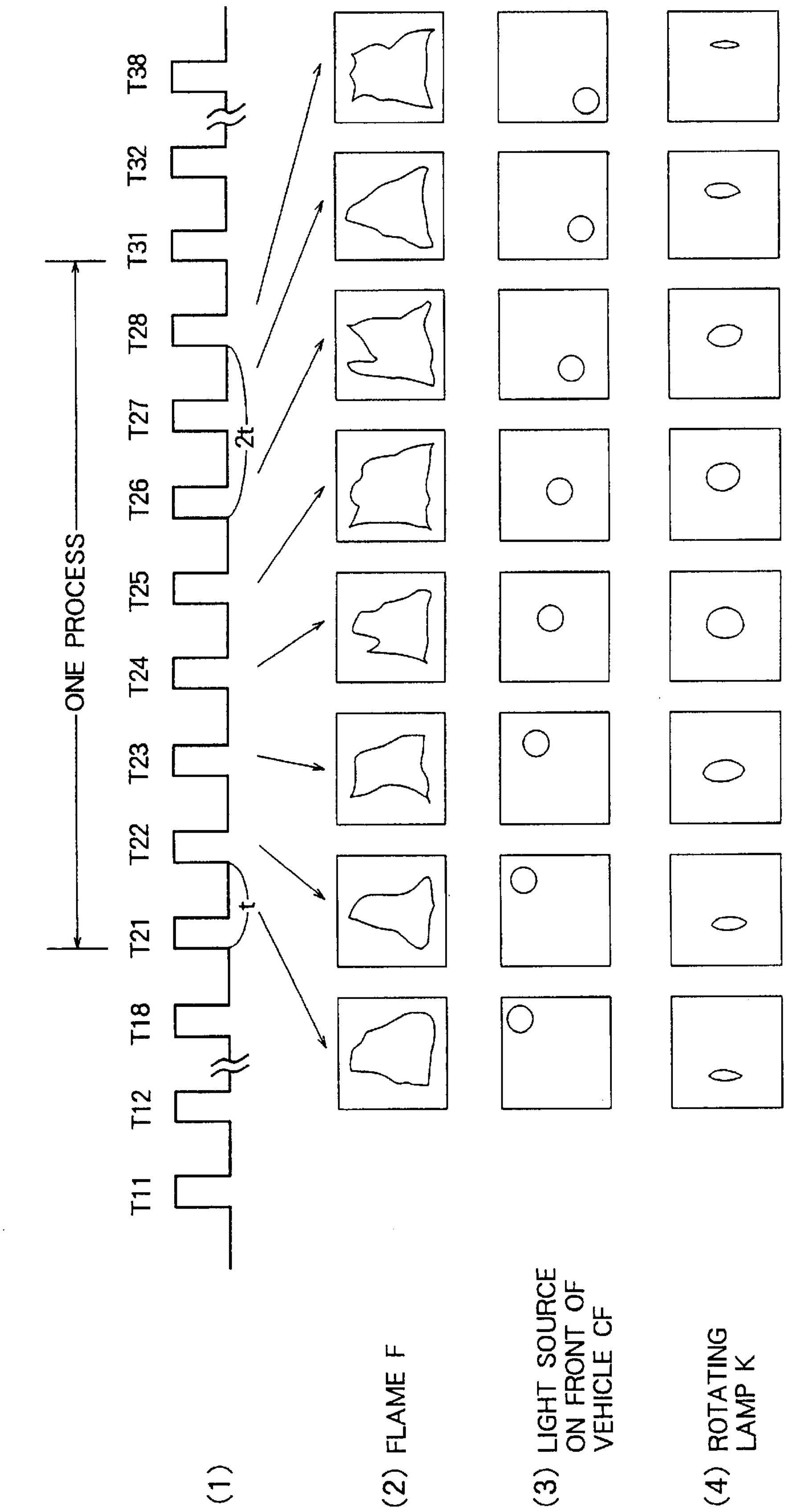
FIG. 4 shows binary images of extracted portions which exhibit a temporal change.

Diagrams (1) to (4) of FIG. 4 show the timing (1) of producing images of the monitoring camera 1, and images produced according to the timing. Images shown in diagrams (2) to (4) of FIG. 4 are eight images containing portions depicting flame F (2), eight images containing portions depicting headlights CF (3) serving as a light source on the front of a vehicle, and eight images containing portions depicting a rotating lamp K (4), all of which are produced at given intervals by the monitoring camera 1. As time passes, a left-hand image is renewed by a right-hand image. The images are images containing portions thereof extracted by the fire portion extracting means 5 and stored in the binary memory 7. The extracted portions alone are enlarged for a better understanding.

As apparent from diagram (2) of FIG. 4, it is seen that the positions of the extracted portions depicting the flame F hardly vary with the passage of time, and that by contrast, the positions of the extracted portions depicting the headlights CF vary, as shown in diagram (3), of FIG. 4 with the passage of time. By judging whether or not the extracted portions stored in the binary memory 7 depict a moving light source, incorrect alarming due to the light source on the front (or back) of a vehicle can be prevented. The processing of the correspondence judging means 11 for identifying a moving light source on the basis of extracted portions stored in the binary memory 7 will be explained in detail using diagrams (1)–(4) of FIG. 4.

The monitoring camera produces, as mentioned above, 30 images per second, the camera that is, produces an image at intervals of 1/30 sec. A pulsating signal shown in diagram (1) of FIG. 4 indicates imaging timing (imaging time instants). Time instants at which a pulse is generated, that is, time instants T11 to T18, T21 to T28, and T31 to T38 are time instants at which the monitoring camera 1 produces an image. The cycle t of the pulse is therefore 1/30 sec. The sampling cycle can be set to any value. For example, when frequency analysis or the like is performed on a portion extracted by the fire portion extracting means 5, since flame has a fluctuation of about 8 Hz, when the sampling theorem is taken into account, the sampling cycle should preferably be set to a value smaller than 1/16 sec.

When a given number of images, for example, five to eight images are stored in the binary memory 7, the correspondence judging means 11 judges whether or not the images contain portions depicting the same light source. In this second embodiment, every time eight images are stored in the binary memory 7, it is judged once whether or not extracted portions have a relationship of correspondence. A series of these operations performed once shall be regarded as one process. A preceding one of two numerical characters succeeding letter T meaning a time instant indicates the number of a process concerned, and the other numerical character indicates the number of an image among images handled during one process. For example, T25 indicates the fifth image handled during the second process.

A situation in which images produced by the monitoring camera depict two light sources of flame F and headlights CF will be described using the images produced at the time instants T21 to T28. When judging that eight images are stored in the binary memory 7, the correspondence judging means 11 compares images produced at the time instants T28 and T26 to check if the images have a relationship of correspondence. Herein, the images produced at the time instants T28 and T26 and stored in the binary memory 7 are superposed on each other. If extracted fire-suspected portions of the images overlap even slightly, the portions of the images produced at the time instants T28 and T26 are judged to have the relationship of correspondence, that is, to depict the same light source.

When the time interval of an imaging cycle, that is, a cycle t is very short, the relationship of correspondence may be judged to be established only when the extent of overlapping exceeds a certain level. The method in which the correspondence judging means 11 is used to check if portions of temporally preceding and succeeding images have the relationship of correspondence includes, for example, a method utilizing coordinates of a center of gravity. However, any method can be adopted as long as it can eliminate portions of images depicting light sources that exhibit great magnitudes of movements per unit time. When two portions of an image overlap one portion of another image, one of the two portions whose extent of overlapping is greater is judged as a correspondent portion.

After it is judged whether or not the extracted portions of the images produced at the time instants T28 and T26 have the relationship of correspondence, it is judged whether or not extracted portions of images produced at the time instants T26 and T24 have the relationship of correspondence. The images produced at the time instants T24 and T23, those produced at the time instants T23 and T22, and those produced at the time instants T22 and T21 are checked successively to see if the extracted portions thereof have the relationship of correspondence. A total of five pairs of extracted portions have been checked to see if they have the relationship of correspondence. If it is judged that all of the five pairs of extracted portions have the relationship of correspondence, it is judged that the extracted portions of the images produced at the time instants T21 to T28 and handled during one processing are mutually correspondent. That is to say, it is judged that the same light source exists during the time interval between the time instants T21 and T28. When four or less out of five pairs of extracted portions have the relationship of correspondence, it is judged that the extracted portions of the images handled during one processing do not have the relationship of correspondence.

After one process is completed by judging whether or not the extracted portions of images have the relationship of correspondence, it is checked if the extracted portion of an image handled during the previous process (between the time instants T11 and T18) and the extracted portion of an image handled during the current process have the relationship of correspondence. In this case, the portions of the last images handled during the previous and current processes, that is, the fire-suspected portions of the images produced at the time instants T18 and T28 are checked in the same manner as mentioned above to see if they have the relationship of correspondence. If the fire-suspected portions have the relationship of correspondence, the extracted portions of the images handled during the previous process (first process) and the extracted portions of the images handled during the current process (second process) are judged to be mutually correspondent. When the portions of the images produced at the time instants T18 and T28 do not have the relationship of correspondence, the portions of the images produced at the time instants T21 to T28 are treated as newly-developed portions. The label numbers of the portions, and an occurrence time thereof, that is, the number of the process during which the portions appear are stored in the RAM 32.

After the first and second processes of relationship-of-correspondence judgment are completed and when eight images to be handled during a third process are stored in the binary memory 7, a third process is carried out in the same manner as the second process in order to check if the extracted portions of the eight images have the relationship of correspondence. At a last step of the third process, it is judged whether or not the images produced at the time instants T38 and T28 have the relationship of correspondence. When the first fire judging means 12 recognizes that the number of consecutive pairs of fire-suspected portions of images having the relationship of correspondence exceeds a given value, for example, 5 (the number of the images is 40), the first fire judging means 12 judges that the extracted portions are real fire portions. This is attributable to the principle that if the extracted fire-suspected portions are real fire portions, the positions of the portions hardly vary.

Assuming that an entity moves, when the moving speed is slow and the cycle t is very short, if the extracted portion of an image depicting the entity and the extracted portion of an immediately preceding image that is produced a very short time interval earlier are checked to see if they have the relationship of correspondence, the relationship of correspondence is likely to be established. During one process, therefore, the extracted portions of images produced with two different time intervals between respective pairs of extracted portions are checked to see if they have the relationship of correspondence. For example, the images produced at the time instants T21 to T24 are used to judge if pairs of extracted portions of images produced with a cycle t between them have the relationship of correspondence. The images produced at the time instants T24 to T28 are used to judge if pairs of portions of images produced with a cycle 2*t* between them have the relationship of correspondence (i.e., T24, T26, and T28), wherein the images produced at the time instants T25 and T27 are unused. Using the images produced at the time instants T28 and T18, a pair of extracted portions of images produced with a cycle 8$t$ between them are checked to see if they have the relationship of correspondence. Thus, as apparent from the images shown in diagrams (1) to (4) of FIG. 4, all the pairs of the portions of images depicting the flame F have the relationship of correspondence. Although the extracted portions of images, produced at the time instants T21 and T22 having a short cycle between them, depicting the headlights CF have the relationship of correspondence, the extracted portions of images, produced at the time instants T26 and T28 having a double cycle between them, depicting the headlights CF do not overlap at all and do not have the relationship of correspondence.

Thus, since pairs of images produced with different cycle times between them are compared, portions of images depicting an entity like flame whose area varies for a given period of time but which hardly moves can be identified as fire portions. Incorrect alarming will not take place due to portions of images depicting a moving entity such as the headlights CF of a vehicle.

Third Embodiment

As described above, according to the first and second embodiments, false identification as fire of <1> a sodium lamp, <2>a light source on the back of a vehicle, and <3> a light source on the front of the vehicle, which are regarded as three factors of incorrect alarming, can be prevented. This embodiment will be described by taking for instance a situation in which a vehicle needed for construction or inspection stands still in a tunnel during inspection.

Referring back to FIG. 1, the area computing means 15 computes the areas of portions of images stored in the binary memory 7, that is, extracted by the fire portion extracting means 5, or especially, computes the areas of portions of images judged to have the relationship of correspondence by the correspondence judging means 11 and produced for a given period of time. The area computing means 15 computes the area of an overlapping part of a pair of fire-suspected portions (extracted portions) of images produced with a given time interval between them, and the overall area of the portions.

The ratio computing means 20 computes the ratio of the area of an overlapping part of fire-suspected portions of images produced with a given time interval between them to the overall area of the portions, that is, the area ratio between the fire-suspected portions. The area ratio assumes a value ranging from 0 to 1. When the area of an overlapping part of portions agrees with the overall area of the portions, the area ratio assumes a maximum value of 1. A second fire judging means 22 judges from an area ratio computed by the ratio computing means 20 whether or not extracted portions are real fire portions. A general way of calculating the area of an extracted portion is such that the number of pixels, represented by “1” and stored in the binary memory 7, constituting a portion of an image is regarded as the area of the portion. A rectangle circumscribing an extracted portion may be defined and the area of the rectangle may be adopted as the area of the portion. The area computing means 15 and ratio computing means 20 are an example of a means for computing the magnitudes of variations among fire-suspected portions of images produced with a given time interval between them.

The area computing means 15 and ratio computing means 20 pick up a given number of images that are produced with a given same time interval between them, for example, four images out of eight images handled during one process. Three area ratios are calculated using the four images, and a sum of the three area ratios is adopted as a final area ratio. For example, the images produced at the time instants T21 and T22, the images produced at the time instants T22 and T23, and the images produced at the time instants T23 and T34 (images produced with the cycle t between them) are used to calculate area ratios. When area ratios are calculated using images produced with a time interval longer than the cycle t, for example, a cycle 2$t$, between them, the images produced at the time instants T22 and T24, the images produced at the time instants T24 and T26, and the images produced at the time instants T26 and T28 are used (See FIG. 4).

In the third embodiment, when the correspondence judging means 11 judges that a plurality of pairs of fire-suspected portions of images have a relationship of correspondence, the second fire judging means 22 judges from the magnitudes of variations among pairs of fire-suspected portions of images produced with two different given time intervals, that is, the cycle t and cycle 2$t$ between them, or in this embodiment, from the area ratios among pairs of fire-suspected portions whether or not the fire-suspected portions are real fire portions. To be more specific, when the pairs of fire-suspected portions of images produced with the cycle t between them and the pairs thereof with the cycle 2$t$ between them exhibit the same magnitudes of variations, that is, when the computed magnitudes of variations (area ratios) are mutually the same, the second fire judging means 22 judges the fire-suspected portions are real fire portions.

Figure 5:
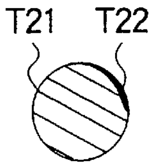
FIG. 5 is a diagram showing extracted portions of superposed images produced at different time instants.
Figure 5:
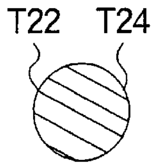
Figure 5:
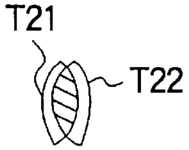
Figure 5:
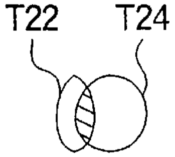
Figure 5:
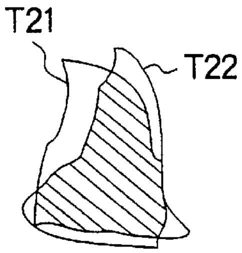
Figure 5:
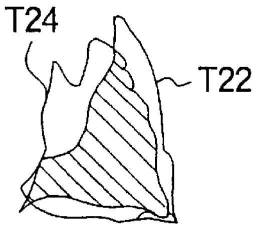

FIG. 5 is a diagram showing pairs of extracted portions of binary images, which are stored in the binary memory 7, produced with a given time interval between them. An overlapping part of each pair of the extracted portions is hatched. The extracted portions depict three light sources, for example, the headlights of a vehicle at a standstill, a rotating lamp, and flame. For an easy understanding of area ratios different with time intervals between images, that is, imaging cycles, the overlapping states of the pairs of the extracted portions of images produced with the cycle t between them, and the area ratios are shown on the left-hand part of the diagram, and the overlapping states of the pairs of the extracted portions of images produced with the cycle 2$t$, which is twice as long as the cycle t, between them, and the area ratios are shown on the right-hand part of thereof.

Referring to FIG. 5, the operations of the area computing means 15 will be described. When the correspondence judging means 11 judges that a given number of pairs of extracted portions have a relationship of correspondence, the area computing means 15 computes areas concerning the pairs of extracted portions which are judged to have the relationship of correspondence. To begin with, computing the area ratios among pairs of extracted portions depicting the headlights of a standstill vehicle will be described. Since the vehicle stands still, the extracted portions of the images produced at the time instants T21 to T28 have exactly the same position and size. The area of an overlapping part of the extracted portions of the images produced at the time instants T21 and T22, and the overall area of the extracted portions, which are computed by the area computing means 15, are exactly the same with each other. The ratio of the area of the overlapping part to the overall area is therefore, 1.0. Needless to say, the area ratios between the extracted portions of the images produced at the time instants T22 and T23, and that between the extracted portions of the images produced at the time instants T23 and T24 are also 1.0. Even when the cycle is changed to the cycle 2$t$, the area ratios are 1.0 (for example, the area ratio between the extracted portions of the images produced at the time instants T22 and T24).

Next, the area ratios among pairs of extracted portions of images depicting a rotating lamp to be mounted on the top of an emergency vehicle, for example, a patrol car or a vehicle used for maintenance and inspection of a road will be described. The rotating lamp has a light emission source in the center thereof, and has some member (light-interceptive member) rotating at a certain speed about the light emission source. Light emanating from the rotating lamp is therefore seen flickering. When the rotating lamp is imaged by the monitoring camera 1, extracted portions of images depicting the rotating lamp are displayed at positions ranging from, for example, the leftmost to rightmost positions within a limited range. After an extracted portion is displayed at the rightmost position, the flickering light goes out temporarily and an extracted portion of another image is displayed at the leftmost position. (See FIG. 4.)

When pairs of images produced with the cycle t between them (for example, images produced at the time instants T21 and T22) are used to compute area ratios, since the positions of the extracted portions are changed to the right with the passage of time, the area ratios are smaller than 1.0, for example, range from 0.6 to 0.8. When pairs of images produced with the cycle 2$t$ between them (for example, images produced at the time instants T22 and T24) are used to compute area ratios, the area ratios are smaller and range from 0 to about 0.2. Thus, the rotating lamp is characterized by the fact that the area ratios computed by the ratio computing means 20 vary depending on the time interval between time instants at which object images are produced.

At last, area ratios calculated when flame of a fire is imaged will be described. The area of flame varies with the passage of time, but the position thereof hardly changes. The area ratios will therefore not be 1.0 but have relatively large values ranging from 0.65 to 0.85. In the case of flame, even when the time interval between time instants at which the flame is imaged is varied, the area ratios will not change. However, the values are different between when the wind blows and when the wind does not blow. When the wind blows, the shape of flame is distorted by the wind. The area ratios therefore tend to assume smaller values.

When the area ratios computed by the ratio computing means 20 fall within a given range, for example, a range from 0.63 to about 0.87, the second fire judging means 22 judges that extracted portions (fire-suspected portions) are real fire portions. Even when the headlights of a vehicle at a standstill or a rotating lamp of a vehicle used for maintenance and inspection is imaged by the monitoring camera, if the fire portion extracting means 5 extracts portions of images depicting the headlights or the rotating lamp as fire-suspected portions, and if the extracted portions are contained in images produced for a given period of time, since the area computing means 15 and ratio computing means 20 are included, the second fire judging means 22 can judge that the fire-suspected portions are not real fire portions. Incorrect alarming will therefore not take place.

As shown in FIG. 5, when the rotating lamp is imaged, if the time interval between time instants at which images containing object extracted portions are produced is the cycle t, the area ratios fall within the range of given values. For computing area ratios, images containing extracted object portions should preferably be produced with two different time intervals between them. Thereby, incorrect alarming due to the rotating lamp will not take place. As mentioned above, a plurality of are a ratios, for example, three area ratios but not one area ratio are computed during one process for handling eight images. This leads to improved reliability of fire judgment. In this case, the given values are three times as large as the aforesaid values, that is, 1.89 to 2.61.

Pairs of fire-suspected portions of images produced with a given time interval between them are superposed on each other, and then the areas of overlapping parts of the pairs of portions and the overall areas of the pairs of portions are computed by the area computing means 15. Alternatively, an area computing means for computing the area of a fire-suspected portion, which is extracted by the fire portion extracting means 5, of an image produced at a certain time instant, and a magnitude-of-variation computing means for computing the magnitudes of variations among the areas of fire-suspected portions, which are computed by the area computing means, of images produced for a given period of time may be included. When the magnitude of a variation exceeds a given value, the fire-suspected portions are judged as real fire portions. Assuming that extracted portions of images depict flame, since the area of flame varies all the time, when an area computed this time is subtracted from an area computed previously, a certain difference is calculated. The subtraction is carried out several times for a given period of time, and differences are added up. When the resultant difference exceeds a given value, the extracted portions are judged to be real fire portions. By contrast, the area of the headlights of a vehicle at a standstill is always constant, a difference between an area computed this time and an area computed previously is substantially nil. Even if both a vehicle at a standstill and flame exist in a monitored field, the area of the headlights of the vehicle does not vary but the area of flame varies all the time. The two light sources can be discriminated from each other. Incorrect alarming due to the headlights can be prevented.

In the second and third embodiments, eight images are fetched during one process, and used to carry out correspondence judgment and area computation. The number of images to be handled during one process is not limited to eight but may be any value. Preferably, the number of images to be handled during one process should be set to four or more. This is because a plurality of area ratios can be calculated using pairs of portions of images produced with two different cycles, that is, the cycles t and 2$t$ between them. Although eight images are fetched during one process, the fifth and seventh images, for example, the images produced at the time instants T25 and T27 are unused for any processing. The fifth and seventh images sent from the monitoring camera may be canceled rather than fetched into the image memory 3.

Figure 7:
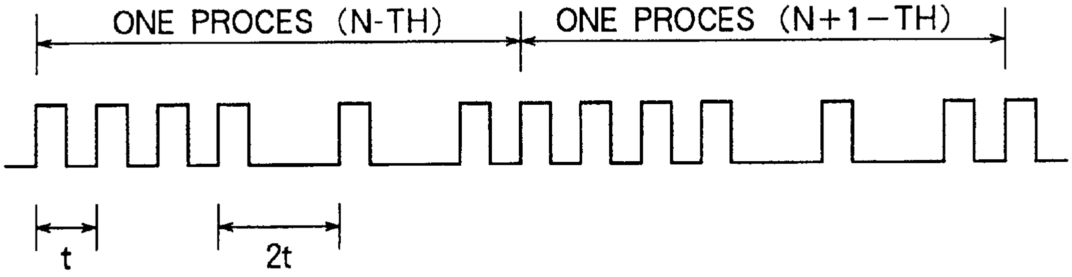
FIG. 7 is a diagram showing imaging timing.

Specifically, since images are fetched periodically into the image memory 3 by means of the MPU 33, an interrupt signal causing the MPU 33 to carry out another job may be sent to the MPU 33 according to the timing of fetching the fifth and seventh images. The same processing as that to be carried out when eight consecutive images are fetched can still be carried out using only six images. Moreover, the number of memories constituting the image memory can be reduced. In this case, the imaging timing shown in diagram (1) of FIG. 4 is changed to the one shown in FIG. 7. Specifically, after four images are produced at intervals of 1/30 sec., two images are produced at intervals of 1/15 sec. A series of operations performed on these images shall be regarded as one process. Imaging is repeated.

As described above, it is the first fire judging means 12 and second fire judging means 22 which judge whether or not fire-suspected portions of images extracted by the fire portion extracting means 5 are real fire portions. A switching means may be included so that when vehicles are driving smoothly within a monitored field, the first fire judging means 12 can be used, and when vehicles are jamming lanes, the second fire judging means 22 can be used.

Figure 6:
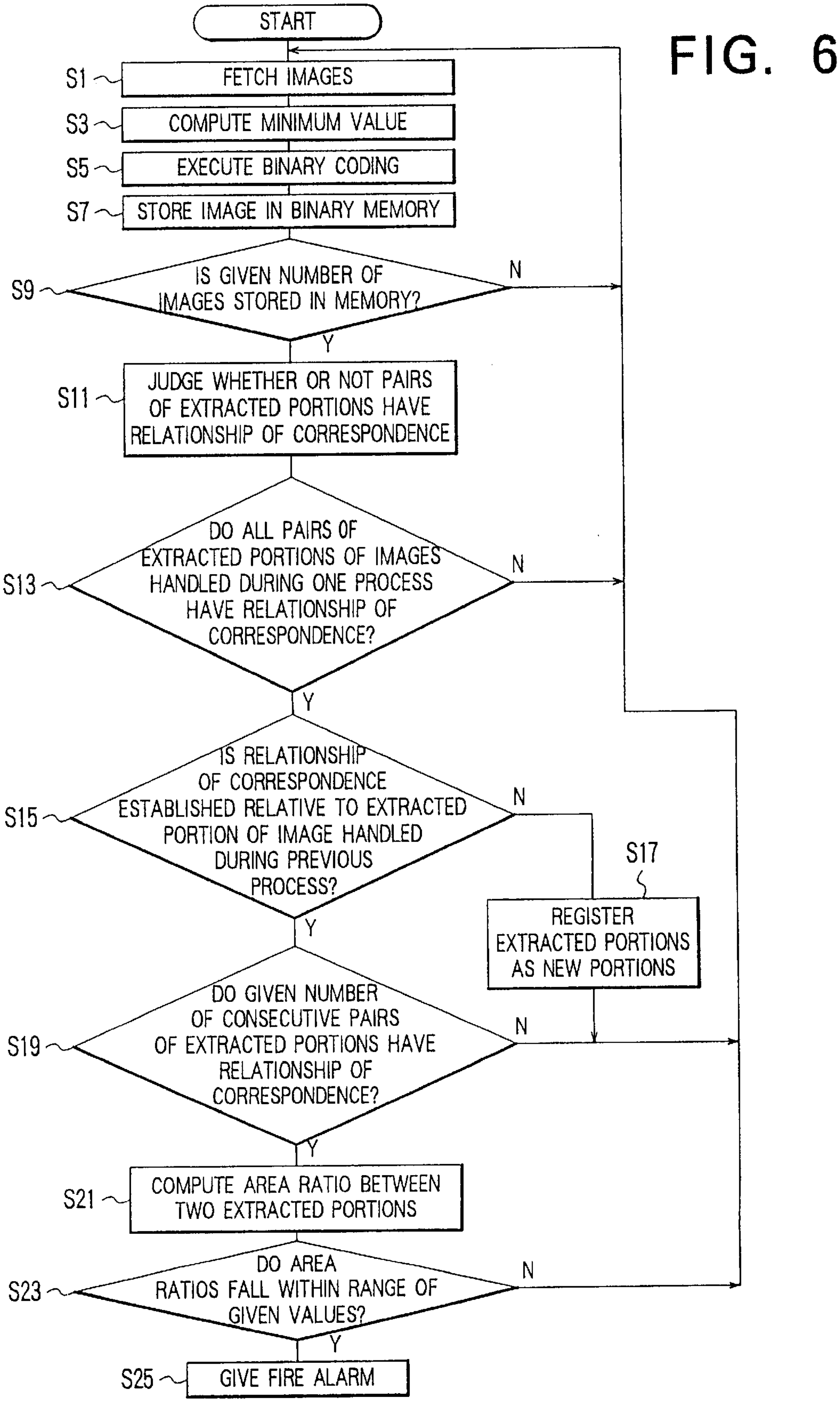
FIG. 6 is a flowchart describing the operations in accordance with the present invention.

The operations carried out in accordance with the first embodiment, second embodiment, and third embodiment will be described briefly using the flowchart of FIG. 6. At step 1, images produced by the monitoring camera 1 are fetched into the image memory 3. The luminance levels of red and green components of each pixel of each image which are fetched into the red-component frame memory 3R and green-component frame memory 3G of the image memory 3 are compared with each other by the minimum value computation unit 4. A lower luminance level of either of the red and green components is output (step 3). The output luminance level is binary-coded with respect to a given value by the fire portion extraction unit 6 (step 5). A portion of the image having a value equal to or larger than the given value is extracted as a fire-suspected portion. The extracted portion is a portion depicting a light source emitting some light.

At step 7, the image subjected to binary-coding is stored in the binary memory 7. It is then judged whether or not a given number of images, for example, eight images are stored in the binary memory 7 (step 9). If eight images are stored (Yes at step 9), at step 11 the correspondence judging means 11 judges if pairs of extracted portions have a relationship of correspondence. Herein, six out of eight images are used to check if five pairs of images have the relationship of correspondence. When all the five pairs of images handled during one process have the relationship of correspondence (Yes at step 13), a last image handled during the previous process and a last image handled during this process are compared with each other and checked to see if the extracted portions thereof have the relationship of correspondence (step 15).

At step 19, it is judged whether or not five consecutive pairs of extracted portions of images have the relationship of correspondence. If so, control is passed to step 21. By contrast, if only four or less pairs of extracted portions of images have the relationship of correspondence in one process, control is returned to step 1 and new images are fetched. If it is found at step 9 that a given number of images is not stored in the binary memory 7 or if it is found at step 13 that four or less pairs of extracted portions of images have the relationship of correspondence, control is returned to step 1. If it is found at step 15 that the extracted portion of an image handled during the previous process and that of an image handled during this process do not have the relationship of correspondence, the extracted portions of images handled during this process are registered as new portions. Control is then returned to step 1.

At step 21, the area computing means 15 computes the area of an overlapping part of two extracted portions of images and the overall area of the portions, and the ratio computing means 20 computes the ratio of the area of the overlapping part to the overall area, that is, the area ratio between the extracted portions. It is judged whether or not computed area ratios fall within a range of given values (step 23). If the area ratios fall within the range, the second fire judging means 22 judges that extracted portions are fire portions, and gives a fire alarm. By contrast, if the area ratios fall outside the range of given values, the extracted portions are judged to depict a light source other than flame. Control is then returned to step 1.

The description has proceeded on the assumption that the monitoring camera 1 is installed in a tunnel that is a monitored field. Alternatively, the monitoring camera 1 may be installed in a large space such as a ballpark or atrium. The present invention has been described to be adapted to a fire detection system for detecting flame alone among several light sources. Alternatively, the present invention may be adapted to a light source discrimination system for discriminating any light source from several other light sources.

What is claimed is:

1. A fire detection system comprising:

an imaging device for imaging a monitored field and for producing images of the monitored field;

an image memory for storing the images produced by said imaging device;

a fire portion extracting means for extracting a fire-suspected image portion from each of the images in said image memory;

a correspondence judging means for judging whether or not a pair of fire-suspected image portions of images produced by said imaging device with a given time interval between the images have a relationship of correspondence with regard to image overlap; and a fire judging means for judging that the fire-suspected image portions extracted by said fire portion extracting means are real fire image portions representing an actual fire when said correspondence judging means judges that a given number of pairs of fire-suspected image portions have the relationship of correspondence.

2. A fire detection system according to claim 1, further comprising:

means for computing a magnitude of a variation with regard to image overlap between fire-suspected image portions of images produced with the given time interval therebetween; and a further fire judging means for judging that the fire-suspected image portions are real fire image portions representing an actual fire when the magnitudes of variations fall within a given range.

3. A fire detection system according to claim 2, wherein said means for computing the magnitude of a variation includes an area computing means for computing an area of an overlapping part of a pair of fire-suspected image portions of images produced with the given time interval therebetween and for computing an overall area of the fire-suspected image portions, and a ratio computing means for computing an area ratio as a ratio of the area of the overlapping part to the overall area of the fire-suspected image portions.

4. A fire detection system according to claim 3, wherein said further fire judging means is operable for judging that the fire-suspected image portions are real fire image portions representing an actual fire when the area ratio falls within a given range.

5. A fire detection system according to claim 2, wherein said means for computing the magnitude of a variation is operable for computing two kinds of magnitudes of variations including a magnitude of a variation with regard to image overlap between fire-suspected image portions of images produced with a first given time interval therebetween, and a magnitude of a variation with regard to image overlap between fire-suspected image portions of images produced with a second given time interval, which is different then the first given time interval, therebetween.

6. A fire detection system according to claim 5, wherein said further fire judging means is operable for judging that the fire-suspected image portions are not real fire image portions when the magnitudes of variations of the fire-suspected image portions of images produced with the first given time interval therebetween have different values than the magnitudes of variations of the fire-suspected image portions of images produced with the second given time interval therebetween.

7. A fire detection system according to claim 1, wherein said correspondence judging means is operable for judging whether or not a pair of fire-suspected image portions of a respective pair of successive images produced by said imaging device with a given time interval between the images have a relationship of correspondence with regard to image overlap, every time said image memory stores a plurality of images.

8. A fire detection system according to claim 1, wherein said correspondence judging means is operable for judging, every time said image memory stores a plurality of images, whether or not a relationship of correspondence with regard to image overlap exists between a pair of fire-suspected image portions of a respective pair of images produced by said imaging device with a given time interval between the images such that the pair of images are mutually separated by the plurality of images.

9. A fire detection system according to claim 1, wherein said imaging device is operable to produce, during a period, a number of images which is less than a maximum number of images which can be produced during the period with the given time interval between the images so as to allocate saved processing time to image processing.

10. A fire detection system according to claim 1, wherein said imaging device is operable to output a color image signal composed of red, green, and blue color-component signals.

11. A fire detection system according to claim 10, wherein said fire portion extracting means is operable for extracting an image portion represented by the color component signals and having red and green color-component signals which exceed a given level, from each of the images stored in said image memory.

12. A fire detection system according to claim 11, wherein said fire portion extracting means includes a minimum value computation unit for comparing pixel by pixel the red color-component signal and the green color-component signal and for outputting as an output signal one of the red and green color-component signals that has a lower level than the other of the red and green color-component signals, and a fire portion extraction unit for extracting, as a fire-suspected image portion, an image portion which is represented by the output signal of said minimum value computation unit and which exceeds the given level.

13. A fire detection system according to claim 1, wherein said imaging device is operable to monitor a tunnel and is to be installed in the tunnel in such a manner that light emanating from headlights of a vehicle passing through the tunnel will not fall on said imaging device.

14. A fire detection system for use with an imaging device for imaging a monitored field and outputting images, and an image memory for storing the images produced by the imaging device, said fire detection system comprising:

a fire portion extracting means for extracting a fire-suspected image portion from each of the images in the image memory;

a correspondence judging means for judging whether or not a pair of fire-suspected image portions of images produced by the imaging device with a given time interval between the images have a relationship of correspondence with regard to image overlap; and a fire judging means for judging that the fire-suspected image portions extracted by said fire portion extracting means are real fire image portions representing an actual fire when said correspondence judging means judges that a given number of pairs of fire-suspected image portions have the relationship of correspondence.

15. A fire detection system according to claim 14, further comprising:

means for computing a magnitude of a variation with regard to image overlap between fire-suspected image portions of images produced with the given time interval therebetween; and a further fire judging means for judging that the fire-suspected image portions are real fire image portions representing an actual fire when the magnitudes of variations fall within a given range.

16. A fire detection system according to claim 15, wherein said means for computing the magnitude of a variation includes an area computing means for computing an area of an overlapping part of a pair of fire-suspected image portions of images produced with the given time interval therebetween and for computing an overall area of the fire-suspected image portions, and a ratio computing means for computing an area ratio as a ratio of the area of the overlapping part to the overall area of the fire-suspected image portions.

17. A fire detection system according to claim 16, wherein said further fire judging means is operable for judging that the fire-suspected image portions are real fire image portions representing an actual fire when the area ratio falls within a given range.

18. A fire detection system according to claim 15, wherein said means for computing the magnitude of a variation is operable for computing two kinds of magnitudes of variations including a magnitude of a variation with regard to image overlap between fire-suspected image portions of images produced with a first given time interval therebetween, and a magnitude of a variation with regard to image overlap between fire-suspected image portions of images produced with a second given time interval, which is different then the first given time interval, therebetween.

19. A fire detection system according to claim 18, wherein said further fire judging means is operable for judging that the fire-suspected image portions are not real fire image portions when the magnitudes of variations of the fire-suspected image portions of images produced with the first given time interval therebetween have different values than the magnitudes of variations of the fire-suspected image portions of images produced with the second given time interval therebetween.

20. A fire detection system according to claim 14, wherein said correspondence judging means is operable for judging whether or not a pair of fire-suspected image portions of a respective pair of successive images produced by the imaging device with a given time interval between the images have a relationship of correspondence with regard to image overlap, every time the image memory stores a plurality of images.

21. A fire detection system according to claim 14, wherein said correspondence judging means is operable for judging, every time the image memory stores a plurality of images, whether or not a relationship of correspondence with regard to image overlap exists between a pair of fire-suspected image portions of a respective pair of images produced by the imaging device with a given time interval between the images such that the pair of images are mutually separated by the plurality of images.

* * * * *